United States Patent
Zhang et al.

(10) Patent No.: US 7,340,888 B2
(45) Date of Patent: Mar. 11, 2008

(54) DIESEL PARTICULATE MATTER REDUCTION SYSTEM

(75) Inventors: Wenzhong Zhang, Savage, MN (US); Julian A. Imes, Bloomington, MN (US); Todd R. Taubert, St. Paul, MN (US); Timothy L. Ricke, Savage, MN (US); Theodore G. Angelo, St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 11/373,497

(22) Filed: Mar. 10, 2006

(65) Prior Publication Data

US 2006/0236684 A1 Oct. 26, 2006

Related U.S. Application Data

(60) Provisional application No. 60/674,882, filed on Apr. 26, 2005.

(51) Int. Cl.
*F01N 3/00* (2006.01)
(52) U.S. Cl. .......................... 60/297; 60/311
(58) Field of Classification Search ................. 60/297, 60/311; 422/169, 170, 171; 55/DIG. 30
See application file for complete search history.

(56) References Cited

U.S. PATENT DOCUMENTS 3,318,128 A 5/1967 Rhodes
3,712,030 A 1/1973 Priest (Continued)

FOREIGN PATENT DOCUMENTS

DE 33 37 903 A1 5/1985

(Continued)

OTHER PUBLICATIONS

"CRT Filter," *DieselNet Technology Guide*, pp. 1-5 (Mar. 15, 2001).

(Continued)

*Primary Examiner*—Thomas Denion
*Assistant Examiner*—Diem Tran
(74) *Attorney, Agent, or Firm*—Merchant & Gould P.C.

(57) ABSTRACT

A diesel exhaust treatment system is disclosed that includes first and second diesel particulate reduction devices. The first diesel particulate reduction device is located upstream in the exhaust flow and contains an oxidation catalyst coating. The second particulate reduction device is located downstream from the first particulate reduction device and is generally non-catalyzed or lightly catalyzed. Each particulate reduction device comprises a flow-through fabric-type filtration media with substantial internal turbulence. As exhaust gas passes through the catalyzed upstream particulate reduction device, nitric oxide (NO) is oxidized to form nitrogen dioxide ($NO_2$), a portion of which interacts with the particulate trapped within the upstream diesel particulate reduction device to regenerate the upstream device. A remaining portion of exhaust gas containing $NO_2$ enters the downstream diesel particulate reduction device, where an additional portion interacts with the trapped particulate to regenerate the device. The relative volume weighted efficiency of the upstream particulate reduction device and of the downstream particulate reduction device are selected to optimize the overall system particle capture efficiency and backpressure, as well as to balance the amount of $NO_2$ made with the amount of $NO_2$ consumed so as to minimize $NO_2$ emissions.

14 Claims, 2 Drawing Sheets

U.S. PATENT DOCUMENTS

| | | | |
|---|---|---|---|
| 4,098,722 A | 7/1978 | Cairns et al. | |
| 4,276,071 A | 6/1981 | Outland | |
| 4,319,896 A | 3/1982 | Sweeney | |
| 4,372,111 A | 2/1983 | Virk et al. | |
| 4,400,352 A | 8/1983 | Rehnberg et al. | |
| 4,404,007 A | 9/1983 | Tukao et al. | |
| 4,416,674 A | 11/1983 | McMahon et al. | |
| 4,419,108 A | 12/1983 | Frost et al. | |
| 4,451,441 A | 5/1984 | Ernest et al. | |
| 4,462,812 A | 7/1984 | Bly et al. | |
| 4,464,185 A | 8/1984 | Tomita et al. | |
| 4,478,618 A | 10/1984 | Bly et al. | |
| 4,535,588 A | 8/1985 | Sato et al. | |
| 4,625,511 A | 12/1986 | Scheitlin et al. | |
| 4,652,286 A | 3/1987 | Kusuda et al. | |
| 4,665,690 A | 5/1987 | Nomoto et al. | |
| 4,702,075 A | 10/1987 | Jenny | |
| 4,813,233 A | 3/1989 | Vergeer et al. | |
| 4,814,081 A | 3/1989 | Malinowski | |
| 4,864,821 A | 9/1989 | Hoch | |
| RE33,118 E | 11/1989 | Scheitlin et al. | |
| 4,902,487 A | 2/1990 | Cooper et al. | |
| 4,905,470 A | 3/1990 | Reichle et al. | |
| 4,916,897 A | 4/1990 | Hayashi et al. | |
| 4,934,142 A * | 6/1990 | Hayashi et al. | 60/297 |
| 4,961,314 A | 10/1990 | Howe et al. | |
| 5,065,574 A | 11/1991 | Bailey | |
| 5,067,320 A * | 11/1991 | Kanesaki | 60/297 |
| 5,076,821 A | 12/1991 | Bruhnke et al. | |
| 5,082,479 A | 1/1992 | Miller | |
| 5,212,948 A | 5/1993 | Gillingham et al. | |
| 5,240,485 A | 8/1993 | Haerle et al. | |
| 5,243,819 A | 9/1993 | Woerner et al. | |
| 5,248,482 A | 9/1993 | Bloom | |
| 5,293,742 A | 3/1994 | Gillingham et al. | |
| 5,322,537 A | 6/1994 | Nakamura et al. | |
| 5,396,764 A | 3/1995 | Rao et al. | |
| 5,489,319 A | 2/1996 | Tokuda et al. | |
| 5,746,989 A | 5/1998 | Murachi et al. | |
| 5,771,684 A | 6/1998 | Hertl et al. | |
| 5,771,868 A | 6/1998 | Khair | |
| 5,787,707 A | 8/1998 | Hertl et al. | |
| 5,908,480 A | 6/1999 | Ban et al. | |
| 6,294,141 B1 | 9/2001 | Twigg et al. | |
| 6,316,121 B1 | 11/2001 | Maus | |
| 6,325,834 B1 | 12/2001 | Fonseca et al. | |
| 6,516,611 B1 | 2/2003 | Schäfer-Sindlinger et al. | |
| 6,534,021 B1 | 3/2003 | Maus | |
| 6,582,490 B2 | 6/2003 | Miller et al. | |
| 6,669,913 B1 | 12/2003 | Haberkamp | |
| 6,673,136 B2 | 1/2004 | Gillingham et al. | |
| 6,742,331 B2 | 6/2004 | Minami | |
| 6,776,814 B2 | 8/2004 | Badeau et al. | |
| 6,790,248 B2 | 9/2004 | Ishihara et al. | |
| 6,805,849 B1 | 10/2004 | Andreasson et al. | |
| 6,817,174 B1 | 11/2004 | Igarashi et al. | |
| 6,829,891 B2 * | 12/2004 | Kato et al. | 60/297 |
| 6,889,498 B1 | 5/2005 | Chandler et al. | |
| 6,916,450 B2 | 7/2005 | Akama et al. | |
| 6,966,179 B2 * | 11/2005 | Onodera et al. | 60/295 |
| 7,000,384 B2 | 2/2006 | Kagenishi | |
| 7,008,461 B2 | 3/2006 | Kuki et al. | |
| 7,055,314 B2 | 6/2006 | Treiber | |
| 7,078,004 B2 | 7/2006 | Voss et al. | |
| 7,111,453 B2 | 9/2006 | Chandler et al. | |
| 7,128,772 B2 * | 10/2006 | Bruck | 55/385.3 |
| 2002/0170433 A1 | 11/2002 | Pfeifer et al. | |
| 2003/0072694 A1 | 4/2003 | Hodgson et al. | |
| 2003/0086837 A1 | 5/2003 | Bruck et al. | |
| 2003/0097934 A1 | 5/2003 | Bruck et al. | |
| 2004/0013580 A1 | 1/2004 | Bruck et al. | |
| 2004/0221572 A1 | 11/2004 | Treiber | |
| 2005/0132674 A1 | 6/2005 | Toyoda et al. | |
| 2005/0229590 A1 | 10/2005 | Bruck et al. | |
| 2005/0232830 A1 | 10/2005 | Bruck | |
| 2005/0274012 A1 | 12/2005 | Hodgson et al. | |
| 2006/0080953 A1 | 4/2006 | Maus et al. | |
| 2006/0185352 A1 | 8/2006 | Twigg | |
| 2006/0254266 A1 | 11/2006 | Chandler et al. | |

FOREIGN PATENT DOCUMENTS

| | | | |
|---|---|---|---|
| DE | 35 45 762 A1 | 7/1987 | |
| DE | 37 44 265 A1 | 7/1989 | |
| EP | 0 035 053 A1 | 9/1981 | |
| EP | 0 160 482 B1 | 1/1989 | |
| EP | 0 341 832 A2 | 11/1989 | |
| EP | 0 369 163 A1 | 5/1990 | |
| EP | 0 393 257 A1 | 10/1990 | |
| EP | 0 341 832 B1 | 1/1996 | |
| EP | 0 798 452 A1 | 10/1997 | |
| EP | 1 054 722 B1 | 12/2001 | |
| EP | 1 060 004 B2 | 8/2002 | |
| GB | 1 014 498 | 12/1965 | |
| GB | 1 301 667 | 1/1973 | |
| GB | 1 557 780 | 12/1979 | |
| GB | 2 188 559 | 10/1987 | |
| JP | 57-117326 | * 7/1982 | |
| JP | 59-150918 | * 8/1984 | |
| JP | 64-8311 | 1/1989 | |
| JP | 06-294316 | * 10/1994 | |
| JP | 2001-295627 | * 10/2001 | |
| JP | 2001-355431 | * 12/2001 | |
| WO | WO 90/12950 | 11/1990 | |
| WO | WO 91/10048 | 7/1991 | |
| WO | WO 99/44725 | 9/1999 | |
| WO | WO 01/92692 A1 | 12/2001 | |
| WO | WO 2004/047952 A2 | 6/2004 | |
| WO | WO 2004/050219 A1 | 6/2004 | |
| WO | WO 2004/072446 A1 | 8/2004 | |

OTHER PUBLICATIONS

"Innovations," http://www.emitec.com/index.php?lang=en& mid=e4&doc=50, 14 pages (Dated Printed Nov. 13, 2006).

Cooper, B. et al., "Role of NO in Diesel Particulate Emission Control," *SAE 1989 Transactions Journal of Engines*, Section 3, vol. 98, pp. 612-624 (Copyright 1990).

Klein, H. et al., "Diesel Particulate Emissions of Passenger Cars—New Insights into Structural Changes During the Process of Exhaust Aftertreatment Using Diesel Oxidation Catalysts," *SAE Technical Paper Series*, pp. 1-12 (Feb. 23-26, 1998).

Lafyatis, D. et al., "Ambient Temperature Light-off Aftertreatment System for Meeting ULEV Emission Standards," *SAE Technical Paper Series*, pp. 1-5 (Feb. 23-26, 1998).

* cited by examiner

DIESEL PARTICULATE MATTER REDUCTION SYSTEM

CROSS-REFERENCE TO RELATED APPLICATION

The present application claims the benefit of U.S. Provisional Patent Application Ser. No. 60/674,882, filed Apr. 26, 2005, which application is hereby incorporated by reference in its entirety.

TECHNICAL FIELD

The present disclosure relates generally to diesel engine exhaust systems. More particularly, the present disclosure relates to systems and methods for controlling diesel engine exhaust emissions.

BACKGROUND

Diesel engine exhaust contains particulate matter, the emission of which is regulated for environmental and health reasons. This particulate matter generally constitutes a soluble organic fraction ("SOF") and a remaining portion of hard carbon. The soluble organic fraction may be partially or wholly removed through oxidation in an oxidation catalyst; however, this typically results in a reduction of only about 20 percent of total particulate emissions. Thus, vehicles equipped with diesel engines may include diesel particulate filters for more completely removing the particulate matter from the exhaust stream, including the hard carbon portion. Conventional wall flow type diesel particulate filters may have particulate removal efficiencies of about 85 percent. However, diesel particulate filters, particularly those that have relatively high particulate filtration efficiency, are generally associated with high back pressures because of the restriction to flow through the filter. Further, with use, soot or other carbon-based particulate matter accumulates on the diesel particulate filters causing the buildup of additional undesirable back pressure in the exhaust systems. Engines that have large particulate mass emission rates may develop excessive back pressure levels in a relatively short period of time. High back pressures decrease engine efficiency and reduce engine performance. Therefore, it is desired to have diesel particulate filtration systems that minimize back pressure while capturing a high percentage of the particulate matter in the exhaust.

To prevent diesel particulate filters from becoming excessively loaded with particulate matter, it is necessary to regenerate the diesel particulate filters by burning off (i.e., oxidizing) the particulates that accumulate on the filters. It is known to those of skill in the art that one method by which particulate matter may be oxidized is to raise the temperature of the exhaust gas sufficiently to allow the excess oxygen in the exhaust gas to oxidize the particulate matter. Also well-known to those of skill in the art is that particulate matter may be oxidized at a lower temperature in the presence of sufficient amounts of nitrogen dioxide ($NO_2$).

Diesel exhaust inherently contains nitrogen oxides ($NO_x$), which consist primarily of nitric oxide (NO) and nitrogen dioxide ($NO_2$). Typically, the $NO_2$ inherently present in the exhaust stream is a relatively small percentage of total $NO_x$, such as in the range of 5 to 20 percent but usually in the range of 5 to 10 percent. Although some regeneration of a diesel particulate filter occurs at such levels, it is insufficient to result in complete regeneration. The effectiveness of $NO_2$ in regenerating a particulate filter depends in part on the ratio of $NO_x$ to particulate matter in the exhaust stream. This ratio varies across engine applications and engine model years, as both $NO_x$ and particulate matter are regulated species of diesel engine exhaust and the regulated limits vary by year. For example, for on-highway diesel engines, under the emissions regulations in place during the period from 1994 to 2002, the nominal emissions limits over the Federal Test Procedure ("FTP") were 0.1 grams per brake horsepower hour for particulate matter and 4 to 5 grams per brake horsepower hour for $NO_x$. This yields a $NO_x$/particulate ratio of 40 to 50. During the period from 2003 to 2006, the nominal limits are 0.1 grams per brake horsepower hour for particulate matter and 2.5 grams per brake horsepower hour for $NO_x$, yielding a $NO_x$/particulate ratio of 25. During the period from 1991 to 1993, the nominal emissions limit for particulate matter was 0.25 grams per brake horsepower hour and the nominal emissions limit for $NO_x$ was 5 grams per brake horsepower hour over the FTP test cycle, giving a $NO_x$/particulate ratio of 20. In the period from 1988 to 1990, the nominal particulate emissions limits were 0.6 grams per brake horsepower hour and the nominal $NO_x$ emissions limits were 6 to 7 grams per brake horsepower hour over the FTP test cycle, giving a $NO_x$/particulate ratio of about 10. In summary, older engines tend to have lower $NO_x$/particulate ratios (although the ratio does decrease for 2003 to 2006 engines relative to 1994 to 2002 engines). A lower $NO_x$/particulate ratio means that there is potentially less $NO_2$ in the exhaust stream per unit of particulate matter captured on the particulate filter, making regeneration of the particulate filter by $NO_2$ more difficult. A higher $NO_x$/particulate ratio means that there is more $NO_2$ in the exhaust stream per unit of particulate matter, so that the particulate trapped on a particulate filter may more readily be regenerated by $NO_2$.

To promote full regeneration, it is often necessary to increase the quantity of $NO_2$ in the exhaust stream. This is particularly true where the $NO_x$/particulate ratio is relatively small. One method to produce sufficient quantities of $NO_2$ is to use an oxidation catalyst to oxidize a portion of the NO present in the exhaust stream to $NO_2$. However, although nitrogen oxides have been a regulated constituent of diesel exhaust for some time, recent developments have suggested that emissions of $NO_2$ should be regulated separately from overall $NO_x$ because of the adverse environmental and health effects of $NO_2$. Therefore, it is desired that a diesel exhaust treatment system does not cause excessive increases in the amount of $NO_2$ within the exhaust stream. One regulation proposed in California requires that the ratio of $NO_2$ to $NO_x$ in the exhaust gas downstream from an exhaust treatment system be no more than 20 percentage points greater than the ratio of $NO_2$ to $NO_x$ in the exhaust gas upstream from the exhaust treatment system. In other words, if the engine-out NOx mass flow rate is $(NO_x)_{eng}$, the engine-out $NO_2$ mass flow rate is $(NO_2)_{eng}$, and the exhaust-treatment-system-out $NO_2$ mass flow rate is $(NO_2)_{sys}$, then the ratio.

$$\frac{(NO2)sys - (NO2)eng}{(NOx)eng}$$

must be less than 0.20.

Applying an oxidation catalyst coating to a conventional diesel particulate filter may result in excessive $NO_2$ emissions. Therefore, it is desired that a diesel exhaust treatment system capture a high percentage of the particulate matter in the exhaust while minimizing both the back pressure in the exhaust system and the emission of $NO_2$ to the atmosphere.

SUMMARY

A diesel exhaust treatment system is disclosed that includes first and second diesel particulate reduction devices. The first particulate reduction device is located upstream in the exhaust flow and contains an oxidation catalyst coating. The second particulate reduction device is located downstream from the first particulate reduction device and is un-catalyzed or lightly catalyzed. Each particulate reduction device comprises a flow-through-type filtration media with substantial internal turbulence. Flow-through-type filtration media is that which defines flow paths that extend through the length of the device and do not require the gas to pass through the filtration media in order for the gas to flow from the entry of the device to the exit of the device. This flow-through-type filtration media yields moderate filtration efficiencies, typically up to 50% per filter, with relatively low back pressure. As exhaust gas containing particulate matter passes through the upstream particulate reduction device, the catalyst coating promotes the oxidation of the soluble organic fraction (SOF) of the particulate matter to gaseous components and also promotes the oxidation of a portion of the nitric oxide (NO) within the exhaust gas to nitrogen dioxide ($NO_2$). Furthermore, the filtration media of the upstream particulate reduction device captures a portion of the hard carbon particulate matter and a portion of the non-oxidized SOF present in the exhaust. A portion of the net $NO_2$ present, comprising the combination of the $NO_2$ generated by the oxidation catalyst and the $NO_2$ inherently present in diesel exhaust, reacts with the particulate matter trapped on the upstream particulate reduction device, according to the reaction $NO_2+C=CO$ (or $CO_2$)+NO. In doing so, the solid particulate matter is converted to a gas, which flows out of the particulate reduction device.

Not all of the particulate matter emitted from the engine is trapped in the upstream particulate reduction device. Moreover, not all of the $NO_2$ present in the upstream particulate reduction device is consumed in the upstream particulate reduction device. Therefore, exhaust gas containing a residual portion of particulate matter and a residual portion of $NO_2$ enters the downstream particulate reduction device, where an additional fraction of particulate matter is trapped and an additional quantity of $NO_2$ is consumed in reaction with the trapped particulate.

The relative volume weighted efficiency of the upstream particulate reduction device and of the downstream particulate reduction device are selected to optimize the overall system particle capture efficiency and backpressure, as well as to balance the amount of $NO_2$ made with the amount of $NO_2$ consumed so as to minimize $NO_2$ emissions.

DETAILED DESCRIPTION

Figure 1:
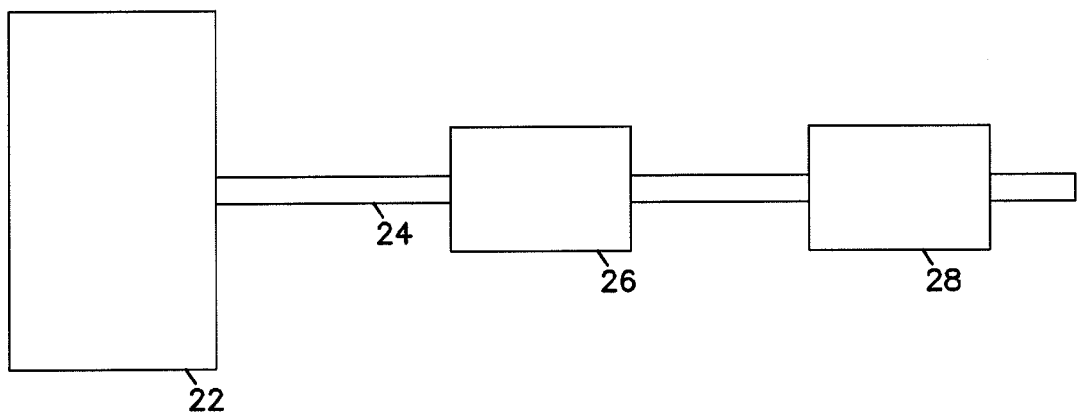
FIG. 1 schematically illustrates an exhaust system having features that are examples of inventive aspects in accordance with the principles of the present disclosure.

The present disclosure relates to an exhaust treatment system for reducing emissions of particulate matter from a diesel engine. FIG. 1 illustrates an exhaust system 20 that is in accordance with the inventive aspects of the present disclosure. The system includes an engine 22 (e.g., a diesel engine) and an exhaust conduit 24 for conveying exhaust gas away from the engine 22. A first diesel particulate reduction device 26 is positioned in the exhaust stream. Downstream from the first diesel particulate reduction device 26 is a second diesel particulate reduction device 28. It will be appreciated that the first diesel particulate reduction device 26 and the second diesel particulate reduction device 28 function together to treat the exhaust gas that passes through the conduit 24. It will also be appreciated that the first diesel particulate reduction device 26 and the second diesel particulate reduction device 28 may be separated by any distance, including being positioned in close proximity or even in direct contact.

Figure 2:
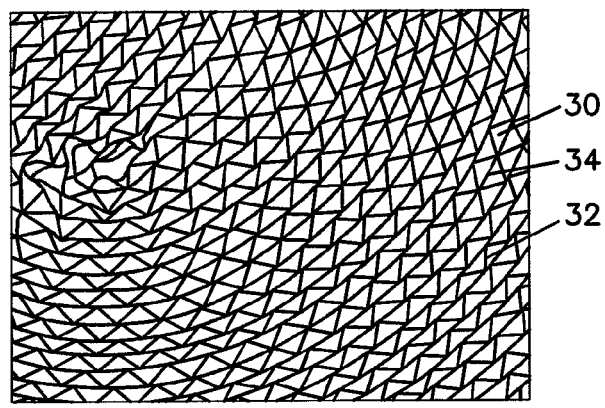
FIG. 2 illustrates a cross section of a diesel particulate reduction device.
Figure 3:
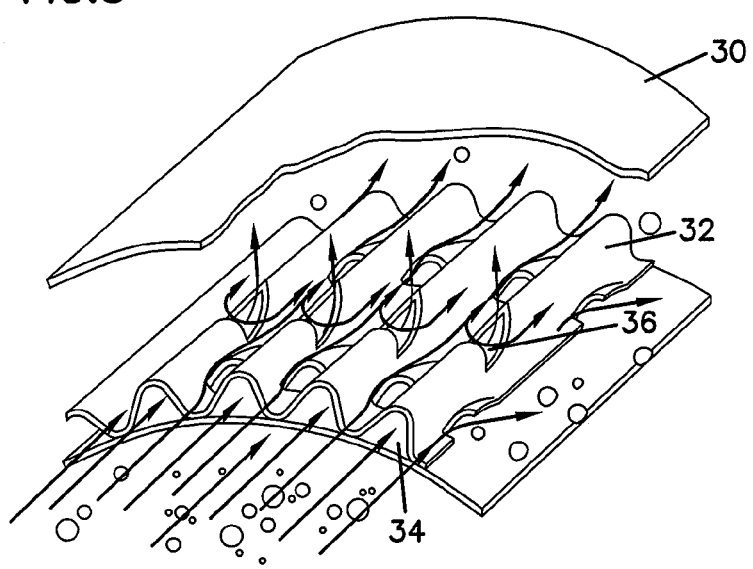
FIG. 3 illustrates a close-up exploded view of a diesel particulate reduction device.

The first diesel particulate reduction device 26, also referred to as the upstream diesel particulate reduction device 26, is preferably constructed from multiple layers of metallic fabric fleece material 30 sandwiched between layers of corrugated metallic foil 32. A cross section of this construction is shown in FIG. 2 and a close-up exploded view is shown in FIG. 3. The corrugated metallic foil 32 defines elongated passageways 34 that are generally parallel to the net flow path of exhaust gases through the particulate reduction device. In operation, the exhaust gases enter through the exposed open ends of the passageways defined by the metallic foil. The metallic foil preferably contains mixing shovels 36 which direct the flow of the exhaust gases out of the passageways and into the fabric fleece material 30. The metallic fabric fleece material 30 is a woven-type material constructed from metallic fibers which capture particles both by impingement and by blocking their flow. The particle-blocking properties of the metallic fleece material 30 are determined in part by the diameter of the metallic fibers used to construct the fleece. For example, metallic fibers of 20 to 28 microns (millionths of a meter) and 35 to 45 microns have been found to work acceptably. As the exhaust gases flow out of the foil 32 and into the fabric fleece material 30, significant internal turbulence is induced. Preferably, the filtration material is manufactured by Emitec and referred to as "PM Kat." The filtration material may, however, comprise any flow-through-type construction known to those of skill in the art, such as wire mesh, metallic or ceramic foam.

The upstream diesel particulate reduction device 26 also contains a catalyst coating. Exemplary catalyst coatings include precious metals such as platinum, palladium and rhodium, and other types of components such as base metals or zeolites. A preferred catalyst for the first particulate reduction device 26 is platinum with a loading level greater than 30 grams/cubic foot of substrate. In other embodiments the precious metal loading level is in the range of 30-100 grams/cubic foot of substrate. The greater the loading level of the catalyst, the greater is the potential for oxidizing gases such as NO to $NO_2$ and for oxidizing the SOF particulates.

The second diesel particulate reduction device 28, also called the downstream diesel particulate reduction device 28, may comprise the same construction as the upstream diesel particulate reduction device 26, preferably having multiple layers of metallic fabric fleece material sandwiched between layers of corrugated metallic foil. The downstream diesel particulate reduction device 28 may, however, comprise any flow-through-type construction, such as wire mesh or metallic or ceramic foam. However, unlike the upstream diesel particulate reduction device 26, the downstream diesel particulate reduction device 28 is either coated with a base metal catalyst without precious metal or is coated with a catalyst with a precious metal loading between 0.001 grams/cubic foot and 15 grams/cubic foot, preferably 0.001 to 10 grams/cubic foot. Furthermore, the downstream diesel particulate reduction device 28 is generally constructed with different particle capture characteristics from those of the upstream device. For example, the downstream diesel particulate reduction device 28 may be constructed from smaller diameter metallic fibers to increase the particulate capture efficiency.

To achieve the objectives of maximizing the system particulate capture efficiency, minimizing pressure drop, and minimizing $NO_2$ emissions, it is necessary to carefully select the system design parameters. The selection of these design parameters will depend in part on the $NO_x$/particulate ratio and the exhaust mass flow rate of the engine. As discussed above, the $NO_x$/particulate ratio depends largely on the emissions regulations in place at the time the engine is manufactured and the mass flow rate is related to the displacement and power output of the engine.

To ensure sufficient regeneration of the particulate reduction devices while minimizing $NO_2$, it is necessary to select the relative precious metal loadings of the catalyst coatings of each particulate reduction device so as to generate the appropriate amount of $NO_2$. The required precious metal loading will depend in part on the residence time of NO within the particulate reduction device, which in turn depends on the mass flow rate of exhaust gas and the volume of the particulate reduction device. The NO residence time may be expressed as a space velocity, defined as the volumetric flow rate of exhaust gases divided by the volume of the device per unit of time.

Preferably, to ensure regeneration without excessive $NO_2$ emissions, the ratio of the mass of $NO_2$ to the mass of particulate matter in the exhaust stream should be between 3.5 and 16. More preferably, this ratio should be between 4.0 and 10. That is, the catalyst coating of the upstream diesel particulate reduction device is selected, based on the space velocity of the device, so that the sum of the $NO_2$ entering the upstream diesel particulate reduction device and the $NO_2$ generated within the upstream diesel particulate device is within the desired ratio. A certain amount of this $NO_2$ will be consumed in the upstream diesel particulate reduction device in reaction with the trapped particulate mass. However, a remaining portion of $NO_2$ will exit the upstream diesel particulate reduction device and enter the downstream diesel particulate reduction device. The amount of $NO_2$ in this remaining portion of $NO_2$ will depend on the amount of $NO_2$ generated in the upstream diesel particulate reduction device and the mass of particulate matter trapped in the upstream diesel particulate reduction device. If this remaining portion of $NO_2$ is insufficient to regenerate the downstream diesel particulate reduction device, then the downstream diesel particulate device should include a precious metal catalyst coating. The precious metal loading of this catalyst coating is selected, based on the space velocity of the device, so that the combination of the $NO_2$ that enters the downstream diesel particulate reduction device and the $NO_2$ that is generated within the downstream particulate reduction device are together sufficient to fully regenerate the downstream diesel particulate reduction device without excessively increasing the $NO_2$ emissions.

The volumetric weighted particle capture efficiency of each particulate reduction device must also be selected. The volumetric weighted particle capture efficiency is computed by, first, subtracting the mass of particulate matter that exits the particulate reduction device from the mass of particulate that enters the particulate reduction device and dividing by the mass of particulate that enters the particulate reduction device; second, multiplying this number by the fraction of the particulate that constitutes hard carbon; and third, dividing by the volume of the particulate reduction device. For example, if a particulate reduction device has a hard carbon filtration efficiency of 20 percent and a volume of 4 liters, then the volumetric weighted particle capture efficiency will be 5.0. Similarly, if a particulate reduction device has a hard carbon filtration efficiency of 40 percent and a volume of 8 liters, then the volumetric weighted particle capture efficiency will also be 5.0. Preferably, the volume-weighted efficiency for the upstream diesel particulate reduction device will be equal to or less than the volume weighted efficiency of the downstream particulate reduction device. Also preferably, the volume-weighted efficiency of either particulate reduction device will be between 3 and 12.5.

The parameters that are adjusted to create the desired volumetric weighted particle capture efficiency of each particulate reduction device are the cross sectional flow area, the flow length, the fabric wire size, and volume. A longer length or a smaller fabric wire size increases particle capture efficiency per unit of volume. For a given particle capture efficiency, decreasing the volume of the particulate reduction device increases the volumetric weighted particle capture efficiency. However, because of the nature of the physical construction of the particulate reduction device, the particle capture efficiency will generally not exceed 50 percent for one device.

The dimensions of each particulate reduction device are also typically constrained by the amount of space available on the vehicle. Preferably, the exhaust treatment system will fit within the same space on a vehicle as occupied by a conventional muffler. On a typical truck application, a conventional vertical muffler is about 10 inches in diameter and about 45 inches long and a conventional horizontal muffler is about 11 inches in diameter and about 36 to 42 inches long.

For example, to apply this system to an on-highway diesel engine with a displacement of 7.3 liters certified under the emissions regulations in place between 1988 and 1990, where the $NO_x$/particulate ratio under applicable regulations was 10 (as discussed above) and where the mass rate of particulate emissions was relatively large, one preferred configuration would be for the upstream diesel particulate reduction device to be 10.5 inches in diameter and 6 inches long and made from 40 micron metallic fibers and for the downstream diesel particulate reduction device to be 10.5 inches in diameter, 3 inches in length and made from 25 micron metallic fibers. This configuration would give a space velocity of the upstream diesel particulate reduction device of no higher than about 450,000 per hour (volumetric flow of exhaust gas divided by volume of the device). The catalyst coating of the upstream diesel particulate reduction device would be about 50 $g/ft^3$ precious metal loading in order to generate sufficient $NO_2$ and yield a $NO_2$/particulate matter ratio of greater than 4. The 40 micron fiber diameter and the longer length of the upstream diesel particulate reduction device are chosen to achieve a hard carbon capture efficiency of about 36 percent and a volumetric weighted efficiency of about 4.5. The 25 micron metallic fiber diameter and the shorter length of the downstream diesel particulate reduction device are chosen to achieve a hard carbon capture efficiency of about 28 percent and a volumetric weighted efficiency of about 7. These system parameters would generally be valid for engines with displacements between about 6 liters and about 13 liters, with rated power levels between about 175 horsepower and 375 horsepower.

As a second example, to apply this system to an on-highway diesel engine with a displacement of 7.3 liters certified under the emissions regulations in place between 1991 and 2002, where the $NO_x$/particulate ratio under the applicable regulations was between 20 and 50 (as discussed above), one preferred configuration would be for the upstream diesel particulate reduction device to be 3 inches long, 10½ inches in diameter, and made from 40 micron metallic fibers and for the downstream diesel particulate reduction device to be 10½ inches in diameter, 6 inches in length, and made from 25 micron metallic fibers. The maximum space velocity of the upstream diesel particulate reduction device is no higher than 900,000 per hour, and preferably is between 20,000 and 800,000 per hour. The catalyst coating of the upstream diesel particulate reduction device would be about 70 g/ft$^3$ precious metal loading in order to generate sufficient $NO_2$ and yield a $NO_2$/particulate matter ratio of greater than 4. The 40 micron metallic fiber diameter for the upstream filter gives a hard carbon capture efficiency of about 20 percent, yielding a volumetric weighted efficiency of about 5. The 25 micron metallic fiber diameter for the downstream filter gives a hard carbon capture efficiency of about 48 percent, yielding a volumetric weighted efficiency of about 6. These system parameters would generally be valid for engines with displacements between about 6 liters and about 13 liters, with rated power levels between about 175 horsepower and 375 horsepower.

As a third example, to apply this system to an on-highway diesel engine with a displacement of 7.3 liters certified under the emissions regulations in place between 2003 and 2006, where the $NO_x$/particulate ratio under the applicable regulations was 25 (as discussed above), the system would assume the same configuration as for the 1991 to 2002 engines, except that the catalyst coating would preferably be 75 to 80 g/ft$^3$ precious metal loading. The precious metal loading is increased relative to the 1991 to 2002 engine application because of the lower $NO_x$/particulate ratio.

In operation, a first portion of the particulate matter contained in the diesel exhaust is deposited on the first diesel particulate reduction device 26 in an amount that is a function of the particle capture efficiency of the first diesel particulate reduction device 26. The exhaust gas exits the first diesel particulate reduction device 26 containing a residual portion of particulate matter, defined as the amount of particulate matter not deposited on the first diesel particulate reduction device 26. The exhaust gas thereafter enters the second diesel particulate reduction device 28, where a portion of the particulate matter present in the exhaust gas is deposited on the second diesel particulate reduction device 28 according to the particle capture efficiency of the second diesel particulate reduction device 28.

Simultaneously, as the exhaust gases travel through the first diesel particulate reduction device 26, the SOF portion of particulate matter is oxidized by contact with the oxidation catalyst coating. Furthermore, the NO present within the exhaust stream is converted to $NO_2$ by the oxidation catalyst coating within the first diesel particulate reduction device 26. A portion of this $NO_2$, along with the $NO_2$ inherently present in the exhaust gas, reacts with the particulate matter trapped on the first diesel particulate reduction device 26. By the reaction of $NO_2+C=NO+CO$ or $CO_2$, a portion of the particulate matter is oxidized and converted from a solid carbon form to carbon monoxide or carbon dioxide gas, which thereby exits the particulate reduction device. There is insufficient mass of soot, however, trapped on the first diesel particulate reduction device 26 to completely consume the $NO_2$ present in the exhaust stream.

Consequently, the exhaust gas exiting the first diesel particulate reduction device 26 contains a residual portion of $NO_2$. This exhaust gas then enters the second diesel particulate reduction device 28. Because the second diesel particulate reduction device 28 is either not catalyzed or is lightly catalyzed, little or no additional $NO_2$ is formed in the second device. However, because not all of the particulate matter in the exhaust was trapped on the upstream diesel particulate reduction device, there is additional soot present in the second particulate reduction device 28. The $NO_2$ in the exhaust stream reacts with this soot, converting a portion of the $NO_2$ into NO. In this way, particulate matter is captured and the particulate reduction devices are regenerated while minimizing $NO_2$ emissions.

Moreover, the preferred design of the particulate reduction devices create significant internal, three-dimensional, turbulent flow patterns by virtue of the highly tortuous, twisted flow vectors that result from flow impacting into the fabric fleece material 30 and being channeled into and out of the openings in the corrugated foil 32. Other flow through filter designs such as wire mesh or ceramic or metallic foams produce similar favorable internal turbulence. This internal local turbulence increases the interaction of the exhaust gas with the catalytic coating on the filtration substrate material, thereby promoting the conversion of NO to $NO_2$. Furthermore, this turbulence increases the interaction of the $NO_2$ with the particulate matter trapped on the surfaces of the diesel particulate reduction device. In doing so, the design of the diesel particulate reduction device promotes the consumption of $NO_2$ and the regeneration of the particulate filter.

Figure 4:
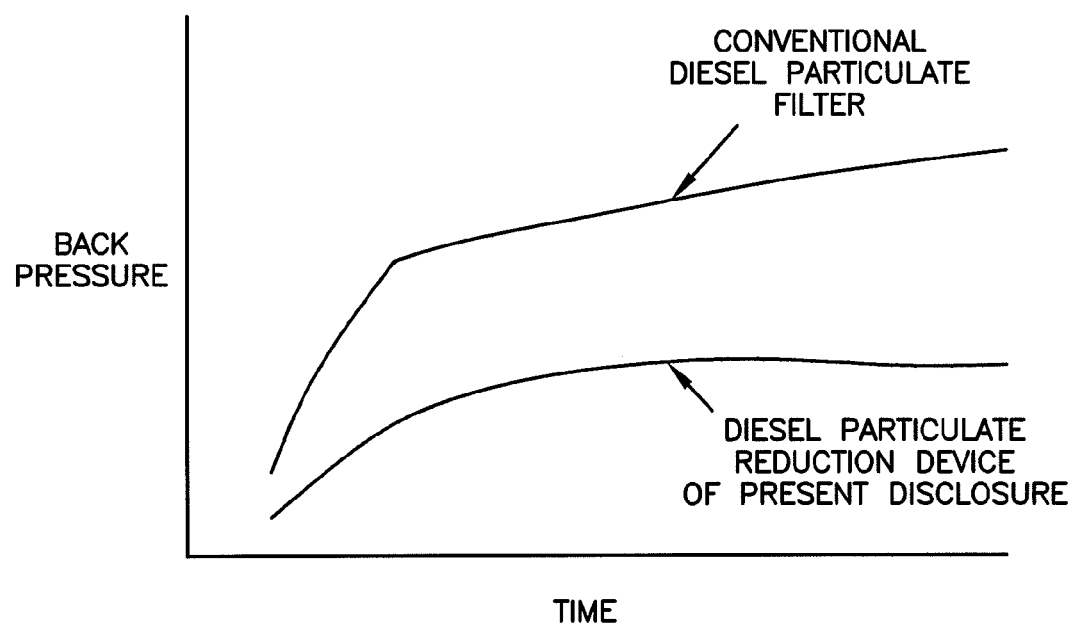
FIG. 4 illustrates the relationship between back pressure and time of a diesel particulate reduction device according to the present disclosure.

Although the particulate capture efficiency of each individual particulate reduction device is no greater than about 50 percent, by arranging the devices according to this disclosure the net particulate capture efficiency may be greater than 50 percent and can approach 85 percent. However, unlike conventional diesel particulate filter systems with comparable efficiencies, such as a wall flow type catalyzed diesel particulate filter, the back pressure is substantially lower. The backpressure is lower both when the device is not loaded with particulate, such as immediately after being regenerated, and when the device is fully loaded with particulate. See FIG. 4. Preferably, the back pressure of the diesel particulate matter reduction system according to the present disclosure is no greater than 4.5 inches of mercury. Also, unlike conventional diesel particulate filter systems that include a catalyst coating, the increase in $NO_2$ emissions are minimized. Generally, the exhaust treatment system of the present disclosure increases the $NO_2/NO_x$ ratio by no more than 20 percentage points over the engine output $NO_2/NO_x$ ratio for engines that generate 0.25 grams per brake horsepower hour or less of particulate matter.

It will be appreciated that the specific dimensions disclosed herein are examples applicable for certain embodiments in accordance with the principles of the disclosure, but that other embodiments in accordance with this disclosure may or may not include such dimensions.

What is claimed is:

1. A diesel exhaust treatment system comprising:
   a first diesel particulate reduction device;
   a second diesel particulate reduction device, a volumetric weighted particle capture efficiency of the first diesel particulate reduction device and a volumetric weighted particle capture efficiency of the second diesel particulate reduction device each being in the range of 3 to 12.5;
   the first diesel particulate reduction device being positioned upstream from the second diesel particulate reduction device within the exhaust treatment system;
   the second diesel particulate reduction device having a higher particle capture efficiency than the first diesel particulate reduction device;
   the particle capture efficiency of the second diesel particulate reduction device being less than 50 percent;
   the first diesel particulate reduction device having a higher precious metal loading than the second diesel particulate reduction device;
   the second diesel particulate reduction device having a larger volume than the first diesel particulate reduction device; and
   the second diesel particulate reduction device having a larger volumetric weighted particle capture efficiency than the first diesel particulate reduction device.

2. The system of claim 1, wherein the first diesel particulate reduction device has a precious metal loading of 30 to 100 grams per cubic foot of substrate material.

3. The system of claim 1, wherein the first diesel particulate reduction device has a precious metal catalyst loading of at least 50 grams per cubic foot.

4. The system of claim 1, wherein the second diesel particulate reduction device does not include any precious metal catalyst loading.

5. The system of claim 1, wherein the volume of the second diesel particulate reduction device is at least twice as large as the volume of the first diesel particulate reduction device.

6. The system of claim 1 wherein the exhaust treatment system reduces emissions of particulate matter by greater than 50 percent and increases the $NO_2/NO_x$ ratio of the exhaust gas to no more than 20 percentage points greater than the $NO_2/NO_x$ ratio of the exhaust gas emitted from the engine.

7. The system of claim 6, wherein the exhaust backpressure is no more than 4.5 inches mercury.

8. The system of claim 6, wherein the first diesel particulate reduction device and the second diesel particulate reduction device are each constructed from flow-through-type filtration media.

9. A diesel exhaust treatment system, the system comprising:
   a first diesel particulate reduction device;
   a second diesel particulate reduction device positioned downstream from the first diesel particulate reduction device based on a direction of exhaust flow;
   the first and second diesel particulate reduction devices each including a filter substrate having metallic fabric material sandwiched between layers of corrugated metallic foil, the corrugated metallic foil defining elongated passageways that are generally parallel to a net flow path of exhaust gas through the filter substrate, the corrugated metal foil including mixing shovels that direct exhaust gas flow out of the elongated passageways and through the metallic fabric material, the metallic fabric material including a plurality of metallic fibers;
   the filter substrate of the second diesel particulate reduction device having metallic fabric material with smaller diameter metallic fibers that the metallic fibers of the metallic fabric material present in the filter substrate of the first diesel particulate reduction device;
   the first diesel particulate reduction device having a higher precious metal catalyst loading than the second diesel particulate reduction device;
   the first diesel particulate reduction device having a lower particle capture efficiency than the second diesel particulate reduction device;
   the first diesel particulate reduction device having a volumetric weighted particle capture efficiency equal to or less than a volumetric weighted particle capture efficiency of the second diesel particulate reduction device; and
   the first diesel particulate reduction device having a smaller volume than the second diesel particulate reduction device.

10. The system of claim 9, wherein the first diesel particulate reduction device has a precious metal catalyst loading of at least 50 grams per cubic foot.

11. The system of claim 9, wherein the second diesel particulate reduction device does not include any precious metal catalyst loading.

12. The system of claim 9, wherein the volume of the second diesel particulate reduction device is at least twice as large as the volume of the first diesel particulate reduction device.

13. The system of claim 9, wherein the first diesel particulate reduction device has a diameter of about 10.5 inches and a length of about 3 inches and the second diesel particulate reduction device has a diameter of about 10.5 inches and a length of about 6 inches.

14. The system of claim 9, wherein the volumetric weighted particle capture efficiency of the first diesel particulate reduction device and the volumetric weighted particle capture efficiency of the second diesel particulate reduction device are each in the range of 3 to 12.5.

* * * * *